United States Patent Office 3,445,216
Patented May 20, 1969

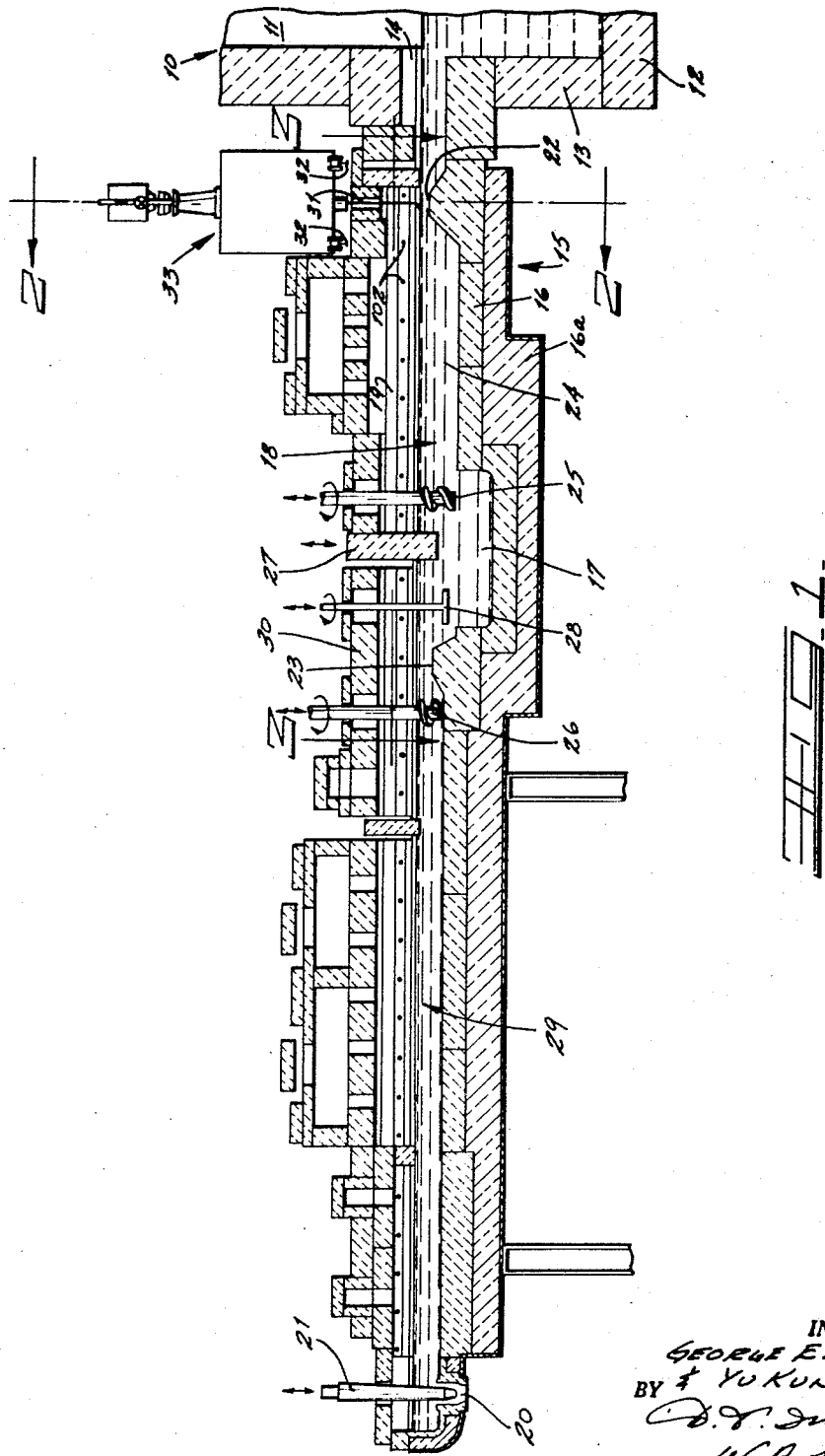

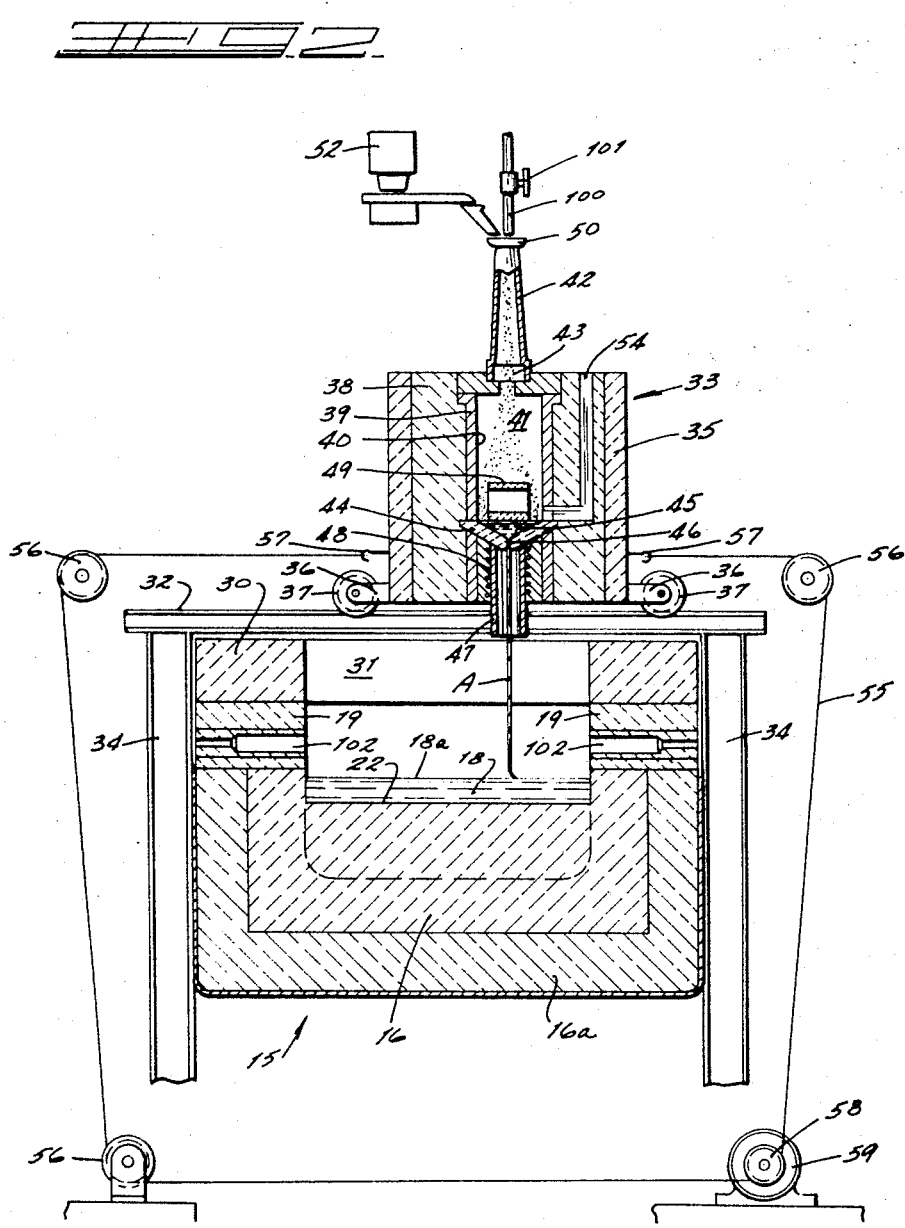

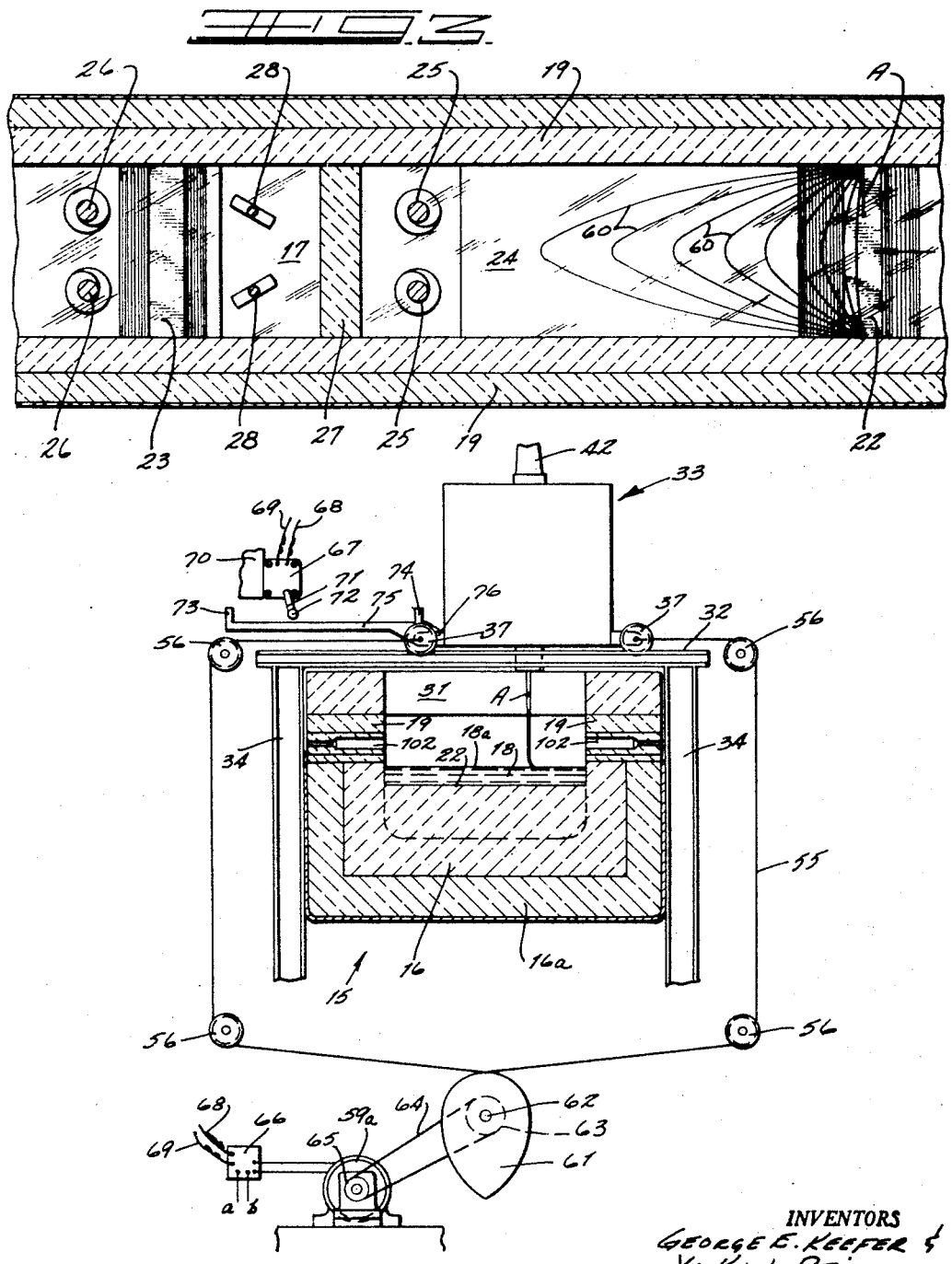

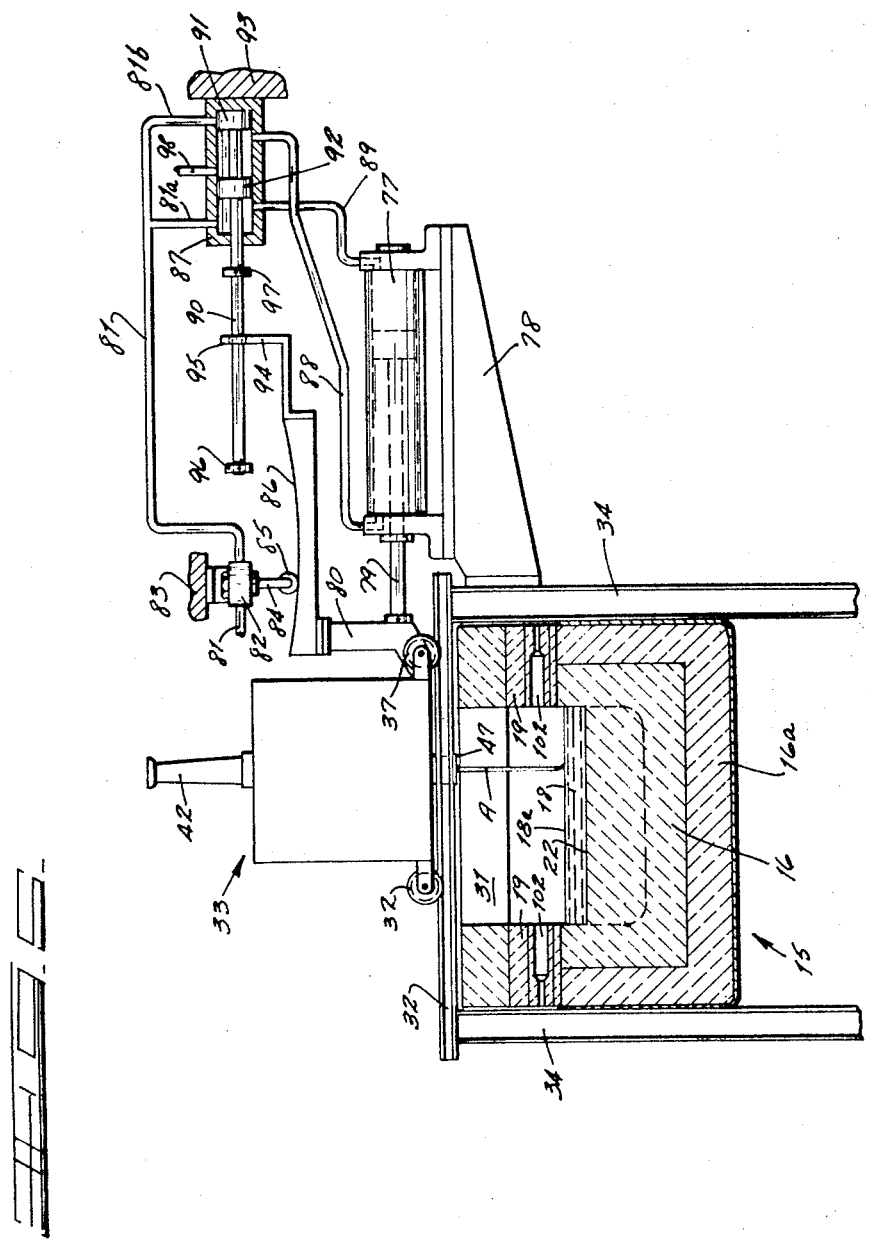

3,445,216
MOLTEN ADDITION OF COLORANT IN A GLASS FURNACE FOREHEARTH
George E. Keefer and Yu K. Pei, Toledo, Ohio, assignors to Owens-Illinois, Inc., a corporation of Ohio
Original application Dec. 6, 1962, Ser. No. 242,682, now Patent No. 3,343,935, dated Sept. 26, 1967. Divided and this application July 12, 1967, Ser. No. 652,773
Int. Cl. C03b 5/32, 5/18
U.S. Cl. 65—145           5 Claims

ABSTRACT OF THE DISCLOSURE

This disclosure is directed to the coloring of a base glass flowing through a forehearth by the addition thereto of a molten, highly colorant, enriched glass. The addition of a colorant to a forehearth while it is in a molten state avoids the production of crystals which may occur when a solid colorant is added and also obviates the necessity of utilizing excessive heat to remelt or melt the ingredients added in dry or unmelted form. An aspirating melter is provided in superimposed relationship with respect to the forehearth. The colorant ingredient is melted above the forehearth and is permitted to flow by gravity in a molten state from the melter into the forehearth and onto the surface of the molten glass flowing therein. The melter is constructed and mounted in such a manner that it may be reciprocated across the width of the forehearth, in this manner providing a distribution of the colorant over the width of the forehearth. By controlling the rate at which the colorant melter is reciprocated, close control may be had with respect to the amount of colorant added at any given lateral or transverse position of the forehearth.

Cross-reference to related application

This application is a division of applicants' copending application Ser. No. 242,682 filed Dec. 6, 1962, now Patent No. 3,343,935 issued Sept. 26, 1967.

Background of the invention

In the manufacture of colored glasses, it has been proposed that a highly colorant enriched solid frit be added to molten glass flowing through a forehearth to obtain a composite colored glass. The frit addition can be made to either a colorless base glass or to a colored base glass containing coloring constituents at substantially lower concentrations than in the desired final or composite colored glass.

By the addition of such solid, colorant enriched frits, the frit must be deposited on, melted in, and uniformly dispersed throughout the molten base glass during travel of the base glass-frit mixture through the forehearth. Problems of crystallization of coloring ingredients, such as chromium oxides, within either the highly colorant enriched frit or the composite glass have been encountered. If crystallization occurs within the frit, as by recrystallization of chromium oxides upon solidification of the frit after melting, such crystals generally show up in the composite glass. Further problems have been encountered in the addition of large amounts of solid frits, due to heat losses incurred upon admixing of the frit with the molten base glass in such quantities as to appreciably lower the temperature of the base glass below that desired during travel through the forehearth. Accordingly, the utilization of electric booster heaters or the like in the forehearth has been required in some instances. Also, the agitation and residence time required for complete dispersion of the solid frit within the molten base glass has necessitated the operation of the forehearth at less than optimum speeds.

Summary of the invention

The present invention is directed to the addition of a highly colorant enriched frit to a base glass, with the frit being molten and the composite glass being formed by the dispersion of the already molten highly colorant enriched composition in the also molten base glass flowing through the forehearth.

The present invention relates to a furnace having an interior melting chamber in which solid colorant frits or frit ingredients are melted for passage through an outlet onto the surface of the molten base glass as it flows through the forehearth. The melting apparatus is mounted for movement transversely of the forehearth to accurately and controllably distribute the molten additive composition onto the surface of the molten glass flowing through the forehearth.

Brief description of the drawings

FIG. 1 is a side elevational view of the forehearth of a glass melting furnace and provided with an apparatus of this invention for carrying out the method of the present invention;

FIG. 2 is a vertical sectional view taken along the plane 2—2 of FIG. 1;

FIG. 3 is a partial plan view of the forehearth taken along the plane 3—3 of FIG. 1, illustrating the distribution of the molten material onto the base glass flowing therein;

FIG. 4 is a somewhat schematic vertical sectional view, similar to FIG. 2, but including one form of control apparatus for moving the frit melting furnace transversely over the forehearth channel; and FIG. 5 is a somewhat schematic vertical sectional view like FIG. 4, which shows a second form of control apparatus for moving the frit melting furnace on the forehearth.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Description of the preferred embodiments

In FIG. 1 of the drawings, there is illustrated a glass making furnace 10 preferably including a melting chamber (not shown) and a refining chamber 11 circumscribed by refractory lined bottom walls 12 and end walls 13. As is well known in the art, the refining chamber 11 communicates with one or more forehearths, such as the forehearth 15, through openings 14 in the end wall 13. The forehearth 15 comprises a bottom wall 16 of a refractory layer and an outer layer of insulating refractory 16a. In the illustrated embodiment of the invention, the forehearth may be provided with a depressed well 17 for varying the depth of the molten glass stream 18 flowing through the forehearth and laterally confined by the side walls 19.

A base glass is melted and refined in known fashion in the melter chamber and refiner chamber 11. The molten base glass 18 flows into the forehearth 15 at the outlet 14. The forehearth is provided at its forward end with an outlet 20 or other means for dispensing the glass which may be under control of the plunger 21. This plunger may be operated by known means (not shown) to control the volume of glass passing through the outlet 20 either by adjustment with respect to the outlet to control the flow therethrough or by reciprocation thereover to discharge gobs of glass therethrough, as indicated by reciprocal arrows on FIG. 1. In the bottom wall 16 are provided transverse upstanding walls or dams 22 and 23 each of which project upwardly from the bottom wall. These are constructed of suitable refractory material, as Zac. The dam 22 serves to produce a relatively rapid local surface flow of the base glass in the region where the molten frit additive material is distributed onto the surface of the stream 18 in the forehearth. The forehearth comprises a section or chamber 24, which, for reference purposes, shall be mentioned herein as the additive chamber. This chamber may be isolated from the remainder of the forehearth insofar as heating is concerned. In this chamber 24, heat is supplied by gas burners 102 located in the side walls 19 of the forehearth above the surface level 18a of the molten glass stream 18. It is necessary to carry temperature in chamber 24 to satisfactorily mix the additive A and the base glass. The usual procedure is to obtain a temperature in chamber 24 at least equal to the temperature of the refiner. As an example, a melter temperature of about 2280° F. is typical in a tank type furnace for making a soda-lime type base glass. The temperature in the forehearth chamber is generally of the order of about 2350° F. The temperature of the glass at the outlet 20 is about 2070° F. in normal operating conditions for forming the glass into containers (bottles, for example). Obviously, these operating temperatures will vary to some extent with variations in glass composition and with the forming that is being performed.

A means of effecting a thorough mixing of the molten addition of material and the base glass from the refiner 11 may take the form of rotatable, helically threaded stirrers 25 and 26. The region of the forehearth where these are installed is downstream of the mentioned chamber 24. In this next region of the forehearth there is formed the well 17, and a vertically adjustable (illustrated by the arrow) well skimmer block 27 tht extends downwardly into the glass in the well 17. The glass as it passes from the chamber 24 into the well 17 is stirred by the forward stirrers 25. This stirrer is adjustable in the glass in the well and is operable to lift the glass as it enters the well and thereby prolong mixing. A rotary circulation is also created.

The stream 18 next passes beneath the skimmer block 27 and while still within the well section 17, the stream is subjected to a further stirring operation by the paddle stirrers 28. These stirrers may comprise horizontal bars or blades attached to the lower end of a rotatable rod that is adjustable vertically in a relationship to the roof of the forehearth. This stirrer homogenizes and mixes the glass and molten additive of the stream 18.

After passing the stirrers 28, the glass flows upwardly to and over the dam 23 which extends above the floor level. The dam 23 then slopes forwardly and downwardly to the stirrers 26 by which final stirring and mixing are effected. The reduction of the depth of glass of the stream 18 over the dam 23 reduces the cross-sectional area of glass. After the stirring and mixing is performed, the resultant colored glass travels forward through the cooling and conditioning section 29 of the forehearth and is dispensed at the feeder outlet 20.

The novel melting apparatus and means for feeding the molten additive into the forehearth 15 will now be described. An upper forehearth wall 30 covers the forehearth and is provided with a transverse opening 31. Superimposed over the upper closure wall 30 of the forehearth are a pair of transverse rails 32 upon which is mounted a melting apparatus, indicated generally as 33, of the present invention. The rails are supported on structural vertical beams 34, as shown on FIG. 2. This melting apparatus includes an exteriorly insulated body 35 mounted on a carriage including projecting ears 36 having wheels 37 engageable with the rails 32 and supporting the body 35 for transverse displacement relative to the forehearth 15.

Disposed within the exterior body shell 35 is an insulating fire brick liner 38 surrounding an interior, cylindrical crystallite tube 39, such as mullite. The inner periphery 40 of the tube 39 circumscribes an upper receiving chamber 41 communicating through a generally conical high pressure burner or inspirator 42 superimposed on the tube and projecting thereabove for a purpose to be hereinafter more fully described.

The inspirator 42 is a standard piece of equipment manufactured by Surface Combustion Company, Toledo, Ohio, and others. Gas at relatively high pressure, generally above two p.s.i., is supplied through the pipe 100 and valve 101 to the inspirator 42 through an accurately drilled orifice in the outwardly flared mouth 50. The stream of discharging gas is directed through the center of the opening in the venturi passageway of the inspirator 42. The energy of the discharging gas entrains or inspirates the proper amount of air to create a combustible fuel-air mixture which discharges from the larger end of the venturi through a burner tip or nozzle 43 into the furnace.

Supported by the tube 39 to extend across the inner periphery thereof is a frusto-conical refractory orifice plate 44 having an upper dished recess 45 communicating through a lower restricted orifice 46 with an outlet tube 47 depending between the tracks 32. Surrounding the tube 47 immediately adjacent the orifice plate 44 is a coiled resistance heater 48, preferably formed of platinum wire, for effectively heating the interior of the tube 47 to maintain molten the material draining from the plate 44 through the orifice 46.

Carried by the tube in general vertical alignment with the orifice 46 is a baffle plate 49 preferably formed of zircon or the like heat resistant refractory material.

The high pressure inspirator tube 42 is provided with an outwardly flared inlet mouth 50 to receive from a vibratory feeder 51 solid granular frit material from an overhead storage bin 52. Upon operation of the feeder 51, material from the bin 52 will be fed transversely, as through an inlet tube 53, into the inspirator tube 42. The combustible fuel-air mixture is discharged from the larger end of the venturi at nozzle 43.

The operation of the frit melting and distributing apparatus of FIG. 2 of the drawings will be readily apparent. The material fed into the inspirator 42 by operation of the vibratory feeder 51 is heated by the air-fuel mixture introduced through inspirator 42 and is blown into the melting chamber 41 in which the finely divided frit material is melted to form a pool in the upper recess 45 of plate 44, this melted material passing through the orifice opening 46 and through the tube 47 onto the upper surface 18a of the body of molten glass 18 flowing through the forehearth 15 from the refiner chamber 11. The provision of the resistance heater 48 prevents any solidification of the molten material as it flows through the orifice plate and the depending tube 47. A side vent stack opening 54 is provided to establish communication between the chamber 41 above the orifice plate 44 and the atmosphere to accommodate the escape of exhaust gases and exhausted fuel from the chamber 41.

The furnace assembly 33 is reciprocated transversely on the rails 32 by means of a drive cable 55 running over spaced idler rolls 56 and having its ends connected, as at 57, to the furnace casing 35. Opposite ends of the cable are subjected to tension, to thereby displace the furnace 33 on the rails 32 by a reversible drive means including pulley 58 driven by motor 59.

Motor drive 59 has a variable speed control that may be program set through the use of a series of variable resistors in the motor circuit to provide variable speed throughout a reciprocating cycle of the furnace assembly 30 transversely over the forehearth 15. Limit switches in the control circuit of motor 59 may be located at opposite sides of the forehearth 15 and engaged by a means carried on the body 35 of the melter apparatus. As such, one form of control may be provided to reciprocate the outlet tube 47 of the melting apparatus 33 the length of the transverse opening 31 in the roof of the forehearth for laying a continuous stream of the molten additive A onto the surface 18a of the base glass stream 18 in the initial end of the forehearth. Thus, a cycling electrical control for driving the furnace reciprocally on the rails 32 across the forehearth may be provided.

Referring to FIG. 3, the differential rate of flow of the base glass in stream 18 is illustrated. Due principally to variations in temperature brought about by radiation heat loss, and also due to flow resistance offered by the side walls 19 of the channel, the longitudinal portions of the glass in the channel nearer the side walls 19 tend to flow at a slower rate than the segment of the glass in and near the center of the channel. Thus, a greater volume of the base glass from refiner 11 passes in the central region of the channel than near the sides. To achieve uniform addition of the additive A, which is being substantially supplied in a uniform stream A out of the outlet tube 47 of the apparatus 33, the melting furnace 33 and its dependent tube 47 is controlled in its traversing, reciprocal movement to supply a uniform ratio of additive to glass moving beneath it in the channel. To do this, the furnace 33 is moved at a variable speed so that as it traverses the central region of the channel 15, its speed will be progressively slower than the movement traversing the regions near the side walls 19 of the channel. To do this, three forms of means for controlling the cyclical movement of the furnace are contemplated. The first is the electrical embodiment disclosed earlier which provides a programed electrical control circuit for varying the speed of the reversible electric motor 59 (FIG. 2). The second is the mechanical embodiment shown on FIG. 4 which will be presently particularly described, wherein the cable 55 for reciprocally moving the furnace 33 on the rails 32 is reeved over a variable speed eccentric, cam type drive pulley 61. The third is the hydraulic or pneumatic embodiment shown on FIG. 5, to be likewise presently described, wherein the furnace 33 is reciprocated by the piston rod of a fluid-pressure operated cylinder-piston assembly. In each of these three embodiments (FIGS. 2–5), the additive A will be laid onto the surface 18a of the glass stream 18 and it will be carried in an elongating loop pattern, indicated at 60 on FIG. 3. Each reversing path of the tube 47 and stream A flowing therefrom will lay down a string or stream of the additive composition on the glass surface. But, since the surface flow varies across the channel, that string or stream of the additive will be distended from a substantially straight pattern into one of the successively elongated and bowed or looped patterns, as indicated by 60 on FIG. 3. Thus, by traveling the string of the composition A at a planned reciprocating rate of movement, an equal amount of the additive will be laid onto a volume of the glass passing through each of the transverse regions of the forehearth. Uniform addition of the molten composition of A will result.

Referring to FIG. 4, the furnace 33 on the carriage wheels 37 running on rails 32 is moved in reversing directions by the cable 55. The cable is reeved to run over the idlers 56 and around the eccentric pulley 61 on a shaft 62 rotatable in fixed bearings (not shown). Shaft 62 is driven through a pulley 63 and a belt 64 on the drive pulley 65 of a variable speed, reversible electric motor 59a. The motor is in circuit with a reversing control 66 connected to mains a and b and regulated by switch gear 67 connected to control 66 by wires 68 and 69. The switch 67 is mounted in a fixed position on a support 70 and has a depending level 71 and roller 72 that reverses the circuits in the unit 68–69–66 to reverse the motor circuits and operate the motor 59a in opposite directions. The lever 71 and roller 72 are in the path of two spaced dogs 73 and 74 on a rod 75. The rod 75 is attached to a bracket 76 on the casing of the furnace apparatus 33. Assume the motor control 66 is set to operate motor 59a in the clockwise direction on FIG. 4, the pulley 61 will drive cable 55 in a counter-clockwise movement over pulleys 56 and at a variable rate. The furnace 33 will move from right-to-left on FIG. 4 at a variable rate. The short radius of pulley 61 is effective for driving the furnace in the central region of the forehearth. As the furnace 33 moves nearer the sides of the channel, the driving radius of pulley 61 increases and drives the cable 55 at a faster rate.

Referring to FIG. 5, the furnace 33 is mounted on its carriage wheels 37 to run on the rails 32 supported by beams 34. A cylinder-piston motor 77 is mounted on a support 78 attached to the superstructure 34. The piston rod 79 is connected to a bracket 80 attached on the casing of furnace 33 and thus moves the furnace reciprocally over the channel. The motor 77 is supplied with an operating fluid under pressure from a source (not shown) supplied in pipe 81 which extends through a throttle valve 82 mounted on a stationary structure 83. Valve 82 is spring loaded and thereby is normally urged to close off line 81. Depending from the underside of the valve is a valve stem 84 and a roller 85 thereon run in engagement with a contoured cam surface 86. The cam 86 is mounted on the bracket 80 so that it is moved reciprocally with the furnace 33 by the motor 77. Cam 86 regulates the throttle valve 82 to vary the rate of flow of operating fluid through pipe 81 and branches 81a and 81b into either end of the reversing valve 87 attached to a stationary structure 93. The two pipes 88 and 89 extend from valve 87 to opposite ends of the cylinder of motor 77 for moving the piston rod thereof. Reversing valve 87 has a central valve stem 90 with spaced lands 91 and 92 which effect alternate connection between the pressure fluid in pipe 81 and the pipes 88 and 89 to opposite ends of the cylinder of motor 77. Cam 86 has an upturned bracket 94 which carries a slide member 95 that is slidable along the outer length of valve stem 90 of the valve 87. A pair of blocks 96 and 97 are pinned at predetermined spaced points along the valve stem 90 and on opposite sides of the slide 95. As shown in FIG. 5, the valve 87 is set to admit operating fluid in pipe 81 through pipe 81a and the valve chamber ahead of land 92 into pipe 89. Fluid from the other end of the cylinder exhausts through pipe 88, the valve housing and exhaust pipe 98. This moves the piston rod 79 of the motor and the furnace 33 to the left. As the furnace tube 47 and string A of additive approach the central region of the channel, the cam 86 causes valve 82 to progressively restrict fluid supply in pipe 81 and the rate of movement up to the center of the channel (and cam 86) decreases. After the center of the channel is reached, the cam 86 gradually rises to lessen the throttling effect of valve 82 and progressively increase the rate of movement. As the left wall of the channel is approached, the rate at which the stream A moves is increased. As the furnace outlet 47 nearly reaches the left wall 19 of the channel, the slider 95 is carried along valve stem 90 to engage the outer block 96. This connects stem 90 to slider 95 and shifts the valve stem and lands 91–91 of valve 87 to the left, thereby reversing motor 77. Operating fluid now passes into the valve by pipe 81b and into pipe 88 to move the piston rod to the right. Fluid is exhausted through pipe 89, between lands 92–91 and exhaust pipe 98. Again, cam 86 will control the rate of movement of the furnace 33 across the forehearth.

THE METHOD OF THE PRESENT INVENTION

The method of the present invention is adapted to be utilized in conjunction with various base glasses melted within the glass melting tank 10 and forming the base glass as stream 18 flowing through the forehearth 15.

BASE GLASS COMPOSITIONS

The base glass used in practicing the present invention may be either (1) essentially a conventional soda-lime glass of the type commonly utilized in the manufacture of colorless containers, or (2) essentially a conventional colored glass, such as Georgia green, emerald green, etc. amber glass.

In the use of a colorless glass, the oxides and the ranges of percentages thereof fall generally within the following ranges:

*Table I.—Colorless base glasses*

| Oxide: | Percent by weight |
|---|---|
| $SiO_2$ | 60 to 75 |
| $Al_2O_3$ | 0.3 to 10 |
| CaO+MgO | 6 to 15 |
| $Na_2O$ | 12 to 18 |
| $K_2O$ | .0 to 5 |
| BaO | .0 to 5 |

The following Examples I and II are soda-lime flint batches which may be used in making the molten base (clear) glass in the present invention:

TABLE II.—COLORLESS GLASSES

| | Example I, percent | Example II, percent |
|---|---|---|
| $SiO_2$ | 72.01 | 71.45 |
| $Al_2O_3$ | 1.74 | 1.32 |
| $Fe_2O_3$ | .039 | .037 |
| $TiO_2$ | .029 | .013 |
| CaO | 11.38 | 8.32 |
| MgO | 1.15 | 5.58 |
| Alkalies | 13.65 | 13.28 |

Other minor constituents, such as selenium, may be present.

The conditions and procedures for making such molten base glasses are conventional and such conditions are well known to those skilled in the art, as exemplified in Table XX, B–11, on page 245 of "Handbook of Glass Manufacture," by Tooley, Ogden Publishing Company, New York, N.Y., 1953.

Generally the base glass issues from the melting tank or refiner and enters the forehearth at a temperature of from about 2300° F. to about 2600° F., and this temperature is well adapted for the addition of the molten frit.

It will be noted that the base glass compositions may contain other minor ingredients, such as selenium, as is commonly practiced in manufacture of a colorless "milk-bottle" pink glass. Also, ferrous (Fe++) iron as an impurity may be present in the batch from which the glass is melted and the herein indicated analysis consolidates all the iron content as calculated $Fe_2O_3$. The FeO content, usually introduced as a sand impurity, is generally held to less than about 0.02% by weight as a quality control measure.

The foregoing detail envisions only an operating condition under which the invention may be utilized. It has in no way a pertinent relationship to the invention, otherwise, and should not be considered as a limiting feature of the method of the invention.

In the event a colored base glass is utilized, the present invention comprehends the initial formation of a molten basic colored glass produced in a large continuously operating, melting tank, such as 10, from a glass batch containing colorant constituents. This molten basic colored glass is channeled through forehearths to forming locations at which the glass is introduced into forming machines for the manufacture of containers or other glass articles.

Exemplary of such a molten basic colored glass are amber container glasses which are manufactured from a glass batch containing iron and sulfur together with sea coal as a reducing agent. The color producing substances in such amber glasses are iron in its ferrous state and sulfur in its sulfide-forming state. These two substances are, as earlier explained, combinable into a chromophore which gives the glass its distinctly amber coloration and which absorbs light in the ultraviolet region. The sea coal serves as a reducing agent to promote formation of the chromophore by the retention of the iron and the sulfur in the desired valence state, i.e. as ferrous iron and sulfide sulfur.

Table III sets forth basic amber glasses adaptable to utilization in the process of the present invention. The compositions of Table III are based on theoretical oxide analysis and the sea coal, which burns off readily from the molten glass, does not appear in the final analysis. Usually, about five pounds of sea coal per ton of sand in the glass batch is admixed with the batch. Further, in Table III the total iron content is expressed as $Fe_2O_3$, even though the iron is present predominantly in its ferrous or FeO state. Such an expression of iron content is in accordance with conventional analysis and composition reporting practice in the industry.

*Table III.—Basic amber glasses*

| Oxide: | Percent by weight |
|---|---|
| $SiO_2$ | 60 to 75 |
| $Al_2O_3$ | 0.3 to 10 |
| CaO+MgO | 6 to 15 |
| $Na_2O$ | 12 to 18 |
| $K_2O$ | 0.0 to 5 |
| BaO | 0.0 to 5 |
| $Fe_2O_3$ | 0.05 to 0.10 |
| S | 0.05 to 0.10 |

In Table IV, a typical basic amber glass A is set forth in terms of the actual oxide analysis of the final glass. Once again, the sea coal content, on the order of five pounds per ton of sand in the batch is not reflected in the indicated analysis.

*Table IV.—Typical basic amber glass A*

| Oxide: | Percent by weight |
|---|---|
| $SiO_2$ | 71.67 |
| $Al_2O_3$ | 2.00 |
| CaO | 11.25 |
| MgO | 0.15 |
| $Na_2O$ | 14.50 |
| $K_2O$ | 0.25 |
| $Fe_2O_3$ | 0.09 |
| S | 0.09 |

The conditions and procedures for making such molten base glasses are conventional and such conditions are well known to those skilled in the art, as exemplified in Table XX, B–11, on page 245 of "Handbook of Glass Manufacture," by Tooley, Ogden Publishing Company, New York, N.Y., 1953.

The typical amber glass of Table IV preferably is formed in a melting furnace at a temperature on the order of 2750° F. and enters the forehearth at a temperature of from 2100° to 2300° F. Within the forehearth, the temperature of the molten glass diminishes along the length of the forehearth to a forehearth outlet temperature of about 2000° to 2070° F.

The utilization of amber glasses, of which the analysis in Table IV is typical, and containing less than about 0.20 percent by weight combined $Fe_2O_3$ and S is conventional. Such glasses have the capability of absorbing substantial light in the ultraviolet regions, i.e. on the order of 500 mu or less, the light transmittance increasing fairly rapidly above about 500 mu.

FRIT COMPOSITIONS

Several different types of frit compositions can be melted to molten state and added as the additive A to the base glasses of Tables I through IV.

For example, the colorless base glasses of Tables I and II may have added thereto frit compositions such as those set forth in Patent No. 2,923,636 to A. B. Swain, assigned to the assignee of the present invention.

Alternatively, frit compositions such as those set forth in U.S. Patent No. 3,024,120 to C. L. Babcock, may be added to a colorless base glass of the type defined in Tables I and II.

For addition to colored base glasses, such as those of Tables III and IV, colorant enriched frits such as those set forth in the copending application of C. L. Babcock, Ser. No. 124,011, filed July 14, 1961, now abandoned, may be utilized.

Additionally, and to be considered within the scope of the invention, other materials for modifying the composition and working properties of the glass may be introduced onto the flowing glass stream 18 as the additive A and mixed with the base glass during its flow through the forehearth. For example, such an additive may be the addition of CaO or $Na_2O$ in substantially glassy and molten form to respectively increase or decrease the setting rate of the molten glass in the molds of the forming machine. Such an additive may be added along with a colorant frit from hopper 52 or it may be merely added to the base glass stream 18 for control of desired physical properties of the finally produced glass.

In any event, the additive composition is preferably prepared in pulverant form by melting the ingredients thereof in a separate unit melter or day tank in which the composition is melted under the proper fining conditions (i.e. oxidizing or reducing atmosphere in the melter), such melting being carried out so that the glass temperature of the melted frit is in the range of 2500° to 2900° F. The melted composition is fed as a molten glassy stream from an outlet of the unit melter and chilled rapidly, as by feeding it into a body of water, so that the glassy material breaks up into granulated form.

FRIT ADDITION

The granulated frit prepared as above explained and of any desired composition, is fed by the vibratory feeder into the melting gas stream at the high pressure inspirator 42. The frit is melted in the chamber 41 to fall upon the baffle plate 49 on which the frit forms a pool in the recess 45 over the orifice 46 of the orifice plate 44. The molten stream A then passes through the orifice and the tube 47, with the heater 48 preventing any solidification of the frit. The small molten stream A flows downwardly onto the upper surface 18a of the molten stream 18 within the forehearth 15. The opening 31 in the forehearth top wall 30 accommodates the passage of the molten frit stream onto the surface of the forehearth stream.

Inasmuch as glass within the refiner 11 and forehearth 15 is flowing continuously from the melter of the tank 10 toward the dispensing outlet 20 (FIG. 1), transverse reciprocation of the melting apparatus 33 will distribute the molten additive A in a reversing path (FIG. 3) over a relatively shallow cross-sectional segment of the glass at the exposed upper surface 18 of the forehearth stream over the dam 22 in the additive chamber 24.

The rate of movement of the furnace 33 may be varied, as hereinbefore disclosed, to supply a reversing path of addition of variable rate to compensate for variable rate of glass flow in segments of the base glass stream 18 flowing in the forehearth channel 15. To achieve this uniform distribution of the additive on the surface of the molten glass stream, the rate at which the furnace is moved across the forehearth will be inversely related to the rate of movement of these segments of the glass stream in the forehearth. More specifically, since the central region of the glass stream in the forehearth flows at a faster rate due to a viscosity and flow resistance differential, the additive stream from the furnace will move at a slower rate over this region. Then as the additive stream moves over the slower flowing side or marginal regions of the glass stream, the furnace will be moved at an increased rate. This will aid the distribution of the molten colorant composition to achieve a more uniform mixing of it with the base glass. Stirrers, such as 25, 26 and 28, may be employed effectively to distribute and mix the molten additive A with the base glass. The passage of the forehearth stream through the well 17 and beneath the skimmer block 27 and over the dam 23 will serve to distribute the molten additive composition into the molten forehearth stream. Further mixing and distribution will occur by virtue of the stirrers 25 acting to retard and mix the stream in the well 17. Additional stirrers 28 and 26 may be provided as desired to obtain the necessary distribution and mixing of the molten frit and the base glass.

EXAMPLE

To compare the molten addition of colorant of the present invention with the solid frit addition of colorant, the following example is given, the base glass composition flowing through the forehearth at a pull of about 6.5 tons per day at a forehearth illustrated in FIGS. 1–3. The colorant added had the following composition.

| Oxide: | Percent by weight |
|---|---|
| $SiO_2$ | 70.4 |
| $Al_2O_3$ | 0.56 |
| $Fe_2O_3$ | 0.79 |
| $TiO_2$ | 0.069 |
| CaO | 12.03 |
| MgO | 0.44 |
| $Na_2O$ | 13.84 |
| $K_2O$ | 0.35 |
| Chromium oxide (total) | 1.69 |
| $Co_3O_4$ | 0.113 |

The results obtained are summarized in Table V, as follows:

TABLE V

| Frit | Feed rate | Color dispersal of colorant | Chrome crystals | | Percent T at 400 mu | Percent total chrome as $Cr_2O_3$ | Percent CoO |
|---|---|---|---|---|---|---|---|
| | | | Visual | Microscope | | | |
| (I) Solid | 6 lbs./hr | OK | None | Several small | 85.2 | 0.014 | .0010 |
| | 10 lbs./hr | OK | do | do | 60.1 | .025 | .0019 |
| | 14 lbs./hr | OK | do | do | 43.6 | .029 | .0019 |
| | 20 lbs./hr | Streaks | do | Many small | 17.7 | .052 | .0035 |
| (II) Molten | 13 lbs./hr | OK | do | A few small | 44.2 | 0.034 | .0025 |
| | 23 lbs./hr | OK | do | do | 30.9 | .038 | .0031 |
| | 30 lbs./hr | OK | A few small | do | 4.5 | .077 | .0054 |

Thus, it will be readily appreciated that the present invention provides a new and novel method for admixing an additive, such as a colorant enriched composition with a molten base glass. Principally, the present invention proposes the addition of the colorant enriched frit in a molten state, thereby reducing the formation of crystalline colorant materials within the composite glass, accommodating better intermixing and mutual dispersion of the two molten materials, eliminating the necessity of auxiliary booster heaters within the forehearth, and making possible the addition of large amounts of colorant materials without excessive heat loss in the forehearth. Further, the present invention provides a specific traveling melting furnace for carrying out the addition and for adding the colorant composition to the base glass in a reversing path assuring proper uniform distribution of colorant through the base glass for ready homogenous assimilation into the final composite glass.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

We claim:

1. Apparatus for adding a molten additive to a molten base glass flowing through a forehearth comprising a frit melting furnace positioned over said forehearth, said frit melting furnace comprising a furnace casing defining a vertical chamber, an upper nozzle opening in said chamber and a lower restricted orifice in said chamber, an inspirator tube having an upper mouth defining an end orifice, an intermediate venturi passageway and a lower outlet means, means mounting the inspirator with its outlet means connected to said upper chamber nozzle, a source of a combustible gas under pressure in communication with the orifice of said inspirator to feed a combustible mixture to said inspirator tube, means for feeding granular frit material to said upper mouth of the inspirator tube, said frit being mixed with the combustible mixture as the latter is burned in said vertical chamber and melted to molten state therein, the molten frit issuing from the lower restricted orifice of the chamber, exhaust means opening into the side wall of said chamber at a point above said lower orifice and means for moving said frit melting furnace transverse of the forehearth.

2. The apparatus defined by claim 1, further including a baffle plate mounted in said vertical chamber in a vertically spaced relationship to said lower orifice.

3. The apparatus defined by claim 1, wherein the forehearth defines an elongated horizontal channel, and means for mounting the frit melting furnace over said channel for movement laterally over said channel.

4. The combination defined in claim 3, which includes a drive means connected to said furnace and operable for laterally, reciprocally, moving said furnace over said channel, whereby the melted molten frit issuing from said furnace is distributed laterally in said channel by gravity flow.

5. The combination defined in claim 4, wherein said drive means includes means for varying the rate of lateral movement of said furnace over said channel such that said furnace is moved at a slower rate across the central region of the channel and is moved at a faster rate across the side regions of the channel.

References Cited

UNITED STATES PATENTS

| | | | |
|---|---|---|---|
| 2,268,247 | 12/1941 | Fox | 65—121 XR |
| 2,268,546 | 1/1942 | Forter | 65—335 XR |
| 2,455,907 | 12/1948 | Slayter | 65—335 XR |
| 2,577,213 | 12/1951 | Slayter et al. | 65—134 |
| 2,951,315 | 9/1960 | Cousen et al. | 65—145 |

FOREIGN PATENTS 904,807   8/1962   Great Britain.

DONALL H. SYLVESTER, *Primary Examiner.*

F. W. MIGA, *Assistant Examiner.*